US009870268B2

(12) United States Patent
Dippenaar et al.

(10) Patent No.: US 9,870,268 B2
(45) Date of Patent: Jan. 16, 2018

(54) VIRTUAL COMPUTING INSTANCE MIGRATION

(71) Applicant: Amazon Technologies, Inc., Reno, NV (US)

(72) Inventors: Andries Petrus Johannes Dippenaar, Western Cape (ZA); Frans Adriaan Lategan, Gauteng (ZA); James Alfred Gordon Greenfield, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 121 days.

(21) Appl. No.: 13/959,550

(22) Filed: Aug. 5, 2013

(65) Prior Publication Data

US 2015/0040127 A1 Feb. 5, 2015

(51) Int. Cl.
*G06F 9/46* (2006.01)
*G06F 9/50* (2006.01)
*G06F 9/48* (2006.01)

(52) U.S. Cl.
CPC .......... *G06F 9/5044* (2013.01); *G06F 9/4856* (2013.01); *G06F 9/505* (2013.01)

(58) Field of Classification Search
CPC ....... G06F 9/5044; G06F 9/4856; G06F 9/505
See application file for complete search history.

(56) References Cited

U.S. PATENT DOCUMENTS 7,313,793 B2 * 12/2007 Traut ................. G06F 9/45537 709/201
7,334,228 B2 * 2/2008 Clohessy ............. G06F 9/5016 709/203
2007/0153691 A1 7/2007 Halpern
2009/0007106 A1 1/2009 Araujo, Jr. et al.
(Continued)

FOREIGN PATENT DOCUMENTS

JP 2008517382 A 5/2008
JP 2008276320 A 11/2008
(Continued)

OTHER PUBLICATIONS

International Search Report and Written Opinion dated Nov. 17, 2014, in International Patent Application No. PCT/US2014/49476, filed Aug. 1, 2014.
(Continued)

*Primary Examiner* — Camquy Truong
(74) *Attorney, Agent, or Firm* — Davis Wright Tremaine LLP

(57) ABSTRACT

A customer submits a set of preferences including hardware specifications for instantiating a virtual machine instance. The virtual machine instance may be instantiated in a physical host computer system that does not conform to the set of preferences. The virtual computer system service may be configured to evaluate the specifications of the available physical host computer systems to determine whether any of the available physical host computer systems conform to the set of preferences. Accordingly, the virtual computer system service may further evaluate the available physical host computer systems to determine whether available physical host computer systems comprise available slots for instantiating the existing virtual machine instance. If the one or more available physical host computer systems have available slots, the virtual computer system service may migrate the existing virtual machine instance to an available physical host computer system in order to fulfill the customer request.

25 Claims, 11 Drawing Sheets

(56) References Cited

U.S. PATENT DOCUMENTS

| | | |
|---|---|---|
| 2010/0153674 A1 | 6/2010 | Park et al. |
| 2010/0242045 A1 | 9/2010 | Swamy et al. |
| 2012/0151476 A1 | 6/2012 | Vincent |
| 2013/0024922 A1 | 1/2013 | Rodriguez |
| 2013/0073731 A1* | 3/2013 | Bose ................. G06F 9/5088 709/226 |
| 2013/0080619 A1 | 3/2013 | Assuncao et al. |
| 2013/0081013 A1 | 3/2013 | Plondke et al. |
| 2013/0339947 A1* | 12/2013 | Neary ............... G06F 9/45558 718/1 |

FOREIGN PATENT DOCUMENTS

| | | |
|---|---|---|
| JP | 2009169672 A | 7/2009 |
| JP | 2013544417 A | 12/2013 |

OTHER PUBLICATIONS

"Decision to Grant a Patent, dated Nov. 15, 2017," Japanese Patent Application No. 2016-533347, filed Aug. 1, 2014, 3 pages.

\* cited by examiner

VIRTUAL COMPUTING INSTANCE MIGRATION

BACKGROUND

Virtual computer systems have evolved and continue to evolve to keep up with the demands of the organizations that use them. Many organizations, for example, utilize virtual computer systems for, among other reasons, the purpose of remotely operating one or more virtual servers, including for the development of web applications. The virtual computer systems are often sized according to coarse dimensions. For instance, these systems may be sized according to the number of processor cores, the type and/or amount of attached storage or other factors. This allows a computing resource service provider to repurpose or subdivide the physical systems in an efficient manner, particularly for capacity management. Despite their many advantages, modern virtual computer system services often lack functionality for providing a customer with requested hardware when a customer submits a request to create or migrate a virtual machine instance.

In some instances, a type of virtual machine instance may be implementable using varying types or generations of hardware. As newer hardware is integrated into a fleet of hardware devices, the newer hardware may include various features lacked by older hardware. For instance, the newer hardware may include features (e.g., chipsets which incorporate cryptographic acceleration) that are not used in determining whether the hardware fits within the aforementioned coarse dimensions. Accordingly, the creation of a new virtual machine instance may include these newer, possibly attractive, features. In such circumstances, customers may provision a virtual machine instance and immediately terminate the instance if the allocated physical host does not meet desired hardware requirements. A customer may repeat this process until an instance is created that is implemented on a physical host that includes the desired hardware configuration. This may result in a less than ideal customer experience and other adverse consequences. Some manners of addressing these issues, such as through the purchasing and provisioning of additional server systems with varying configurations to satisfy customer needs, may present significant additional costs and administrative burden.

BRIEF DESCRIPTION OF THE DRAWINGS

Various embodiments in accordance with the present disclosure will be described with reference to the drawings, in which.

DETAILED DESCRIPTION

Figure 1:
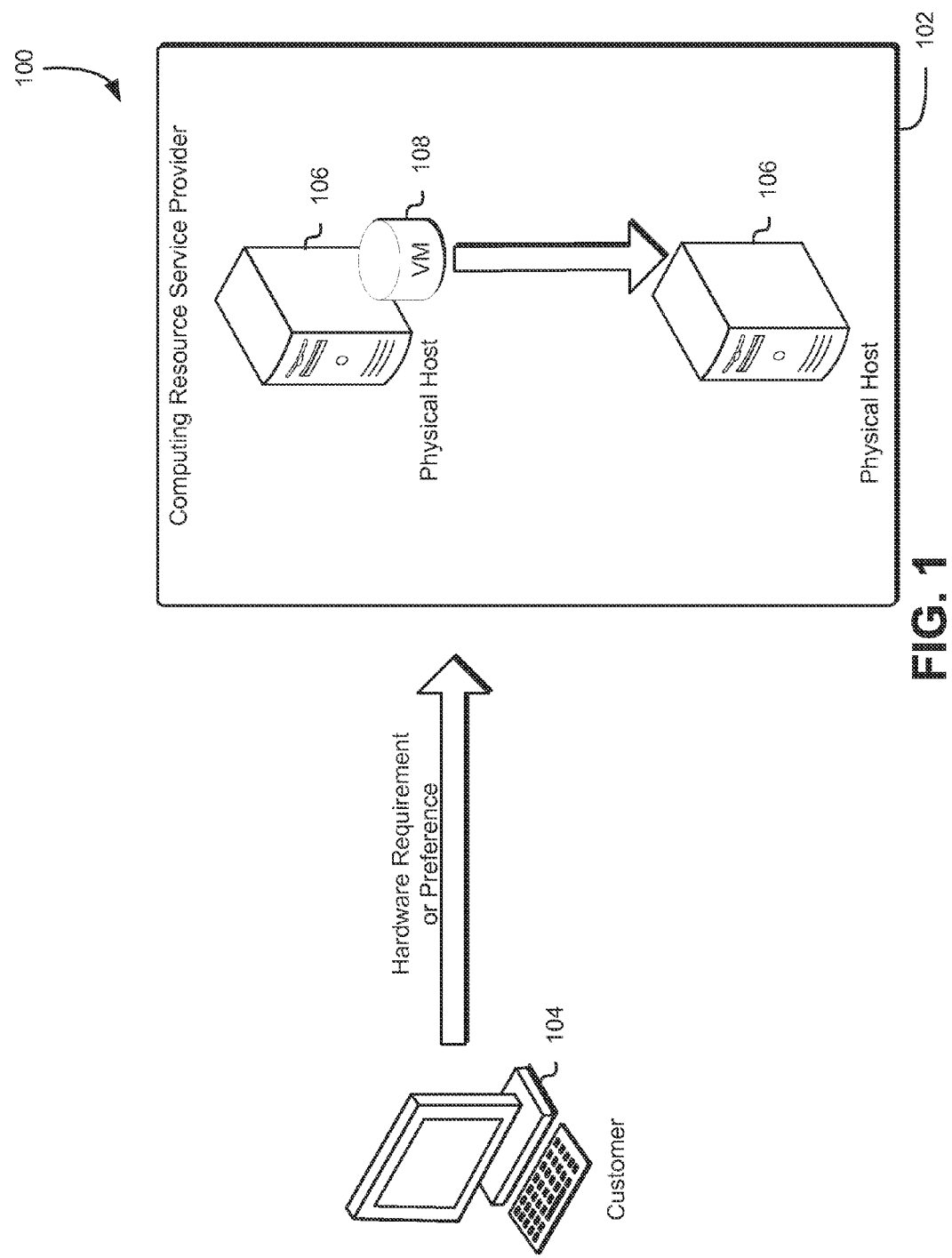
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the allocation and migration of a virtual machine instance based on a customer preference for a specific hardware configuration to instantiate and support the instance. In an embodiment, an entity (e.g., an organization) may communicate with a virtual computer system service, such as through appropriately configured application programming interface (API) calls to the service, to request the creation or migration of a virtual machine instance. The entity may be a customer of a computing resource service provider that operates various services such as data storage services, virtual computer system services and/or database services. A customer may express hardware preferences in various ways, such as through a request for the creation or migration of a virtual machine instance. A requested hardware configuration may be embodied in one or more physical hosts that may be provided by the virtual computer system service. A physical host may comprise various hardware components. For instance, the physical host may include one or more processors, one or more data storage devices (e.g., solid-state drives or magnetic disk drives), random-access memory (RAM) and other components that may be necessary to instantiate and support a virtual machine instance. In some embodiments, the virtual computer system service may configure each physical host to include a number of slots to instantiate the virtual machine instances. These slots may serve to provide a guarantee average performance for the slot for the life of the virtual machine instance by corresponding to an allocation of the various hardware resources of an underlying computer system. Accordingly, when a virtual machine instance is instantiated in a physical host, the instance may be instantiated in one or more slots based on the hardware specifications necessary to instantiate and support the virtual machine instance.

In some embodiments, the virtual computer system service may receive a request from a customer for a virtual machine instance that may include a requirement or preference for hardware specifications to instantiate the instance. Accordingly, the virtual computer system service may determine whether a physical host with the requested hardware specifications is available for allocation. If a physical host with the requested hardware specifications is available, the virtual computer system service may allocate the virtual machine instance to the available physical host. If the requested hardware is not available, the virtual computer system service may determine whether the request for specific hardware is a preference or a requirement set forth by the customer. The virtual computer system service may allocate the instance to a non-conforming physical host if a physical host with the requested hardware specifications is not available and the customer request is a preference for certain hardware specifications to support and instantiate the virtual machine instance. However, if a physical host with the requested hardware specifications is not available and the request is a firm requirement set forth by the customer, the virtual computer system service may refrain from allocating the instance to a non-conforming physical host and instead display an error message that may include, for example, an estimated time until an appropriate physical host is available and other available options available to the customer for the requested virtual machine instance.

In some embodiments, the virtual computer system service may persistently store a customer hardware specification preference in metadata associated with a virtual machine instance. When the virtual computer system service detects that one or more slots within a physical host have become available, the virtual computer system service may query the metadata of any existing virtual machine instances to determine whether a customer has requested that the instance be migrated to a physical host with hardware specifications matching the specifications included in the customer request. If the metadata associated with multiple virtual machine instances indicates a request for migration to a physical host with particular hardware specifications, and the now available physical host includes matching hardware specifications for these virtual machine instances, the virtual computer system service may apply one or more criteria to determine which virtual machine instance may be migrated to the physical host. Accordingly, the virtual computer system service may obtain one or more snapshots of the selected virtual machine instance and transfer the snapshots to the target slots in the physical host. Subsequently, the virtual machine instance may be paused and transferred to the targeted slots in the physical host. Thus, the virtual machine instance may be migrated and activated in a physical host with the requested hardware specifications specified in the instance metadata.

In some embodiments, the virtual computer system service may receive a request for certain hardware specifications to support an existing instance. As noted above, if a physical host includes one or more available slots and comprises the requested hardware specifications, the virtual computer system service may allocate the existing instance to the physical host slots using a similar process as that described above. However, if a physical host with the requested hardware specifications is not available, the virtual computer system service may evaluate the request to determine whether the request is a preference or a requirement, as noted above. Thus, if the request is merely a preference for a certain set of hardware specifications, the virtual computer system service may not migrate the existing instance until such time that one or more slots in a physical host with the requested hardware specifications is made available. Otherwise, if the request is a set customer requirement, the virtual computer system service may display an error message and await any new customer requests for migration.

In this manner, a virtual computer system service may allocate one or more virtual machine instances to physical hosts that satisfy customer hardware specification requirements. In addition, the techniques described and suggested herein facilitate additional technical advantages. For example, because, in some embodiments, the virtual computer system service may migrate an existing virtual machine instance to a physical host based on customer preferences or requirements, this may eliminate the practice of creating and terminating virtual machine instances if the physical host used to instantiate the instance does not initially match customer hardware specification requirements. Additionally, since, in an embodiment, the virtual computer system service may automatically migrate a virtual machine instance to a different physical host based on customer hardware specification requirements, the customer may no longer need to continuously submit requests to allocate an existing virtual machine instance to a physical host with the requested hardware specifications. This, in turn, may reduce the need for new hardware to support customer requests and thus may reduce the cost of any new hardware components and the associated cost of maintenance of these components. The backlog of customer requests for certain hardware specifications may also provide valuable information to the computing resource service provider. For instance, the backlog may be used to inform system capacity planning and/or hardware purchasing decisions. Additional uses are also enabled by the various techniques described therein.

FIG. 1 shows an illustrative example of an environment 100 in which various embodiments may be practiced. In the environment 100, a computing resource service provider 102 may provide various computing resource services to customers of the computing resource service provider. The computing resource service provider 102 may be an organization that hosts various computing resources on behalf of one or more customers. For example, a computing resource service provider may operate one or more facilities that are used to host various computing hardware resources, such as hardware servers, data storage devices, network devices, and other equipment, such as server racks, networking cables and the like. The computing resource service provider 102 may utilize its computing hardware resources to operate one or more services. Such services may include services that enable customers of the computing resource service provider to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a website, operating enterprise systems supporting an organization, distributed computation and/or other activities.

Accordingly, as illustrated in FIG. 1, the environment 100 includes a customer 104. The customer 104 may be an individual or organization that could utilize one or more services provided by the computing resource service provider 102 to remotely manage computing resources to support his or her operations, such as webpage development or database management. The customer 104 may, through a customer computing device, submit one or more requests to a virtual computer system service provided by the computing system service provider 102 to configure a virtual machine instance which may be used to support the customer's needs. The one or more requests may include a hardware specifications requirement or preference which may serve to further support the operating system and/or applications that are included in the virtual machine instance. For instance, if a customer 104 is going to use the virtual machine instance to create and test resource-intensive applications, the customer 104 may require significant processing power and storage capacity to support these applications. Alternatively, if a customer 104 will utilize a virtual machine instance for word processing and spreadsheet manipulation, extensive resources may not be necessary. Accordingly, the virtual computer system service may instantiate a virtual machine instance onto a physical host 106.

The physical host 106, as noted above, may comprise a plurality of hardware components. For instance, the physical host 106 may include one or more processors, several RAM chipsets and one or more storage devices (e.g., solid-state drives or magnetic disk drives) configured to persistently store and instantiate the virtual machine instances 108. As will be illustrated in greater detail in connection with FIG. 4, each physical host 106 may be configured to comprise one or more slots for instantiating and supporting one or more virtual machine instances 108. These slots serve to allocate an average set of performance metrics to each of the virtual machine instances 108 instantiated therein. For instance, depending on the requested type of virtual machine instance 108, the virtual computer system service may allocate one or more slots to the virtual machine instance 108.

At any point after a virtual machine instance 108 has been instantiated in one or more slots in a physical host 106, the customer 104 may submit a request to the virtual computer system service which may include a preference or requirement for a specific hardware specification that should be used to instantiate and support the virtual machine instance 108. Accordingly, the virtual computer system service may determine whether any physical hosts 106 available within the system comprise available placement locations that can be used to provide the requested specifications. For instance, a placement location may be identified based on locating one or more available slots in a physical host comprising the specific hardware specifications requested. Thus, if a physical host 106 is found that can be used to fulfill the request, and the physical host includes sufficient slots to instantiate the virtual machine instance 108, the virtual computer system service may migrate the virtual machine instance 108 to this physical host 106 and release the slots which were previously used to instantiate this instance. However, if a physical host 106 is not available to fulfill the request, the virtual computer system service may not migrate the virtual machine instance 108 and/or may display an error message.

Figure 2:
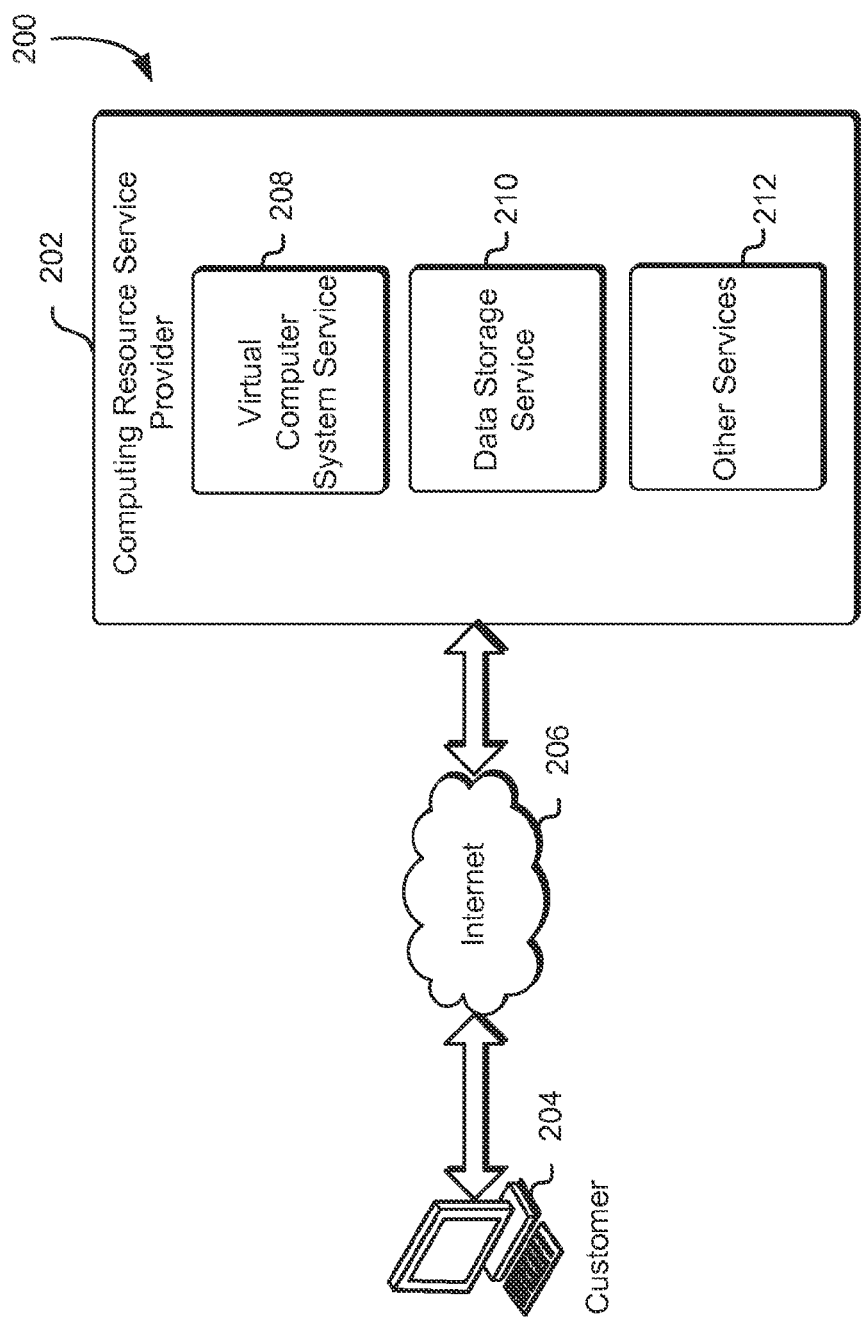
FIG. 2 shows an illustrative example of an environment in which various embodiments can be implemented.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to remotely generate, test and maintain one or more web servers or applications. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. For instance, in this particular illustrative example, the computing resource service provider 202 provides at least two types of services. The services provided by the computing resource service provider, in this example, include a virtual computer system service 208, a data storage service 210, and one or more other services 212, although not all embodiments of the present disclosure will include all such services and additional services may be provided in addition to or as an alternative to services explicitly described herein.

The virtual computer system service 208 may be a collection of computing resources configured to instantiate virtual machine instances onto virtual computer systems on behalf of the customers 204 of the computing resource service provider 202. Customers 204 of the computing resource service provider 202 may interact with the virtual computer system service 208 to provision and operate virtual computer systems that are instantiated on physical computing devices hosted (e.g., physical hosts) and operated by the computing resource service provider 202. The virtual computer systems may be used for various purposes, such as to operate as servers supporting a website. Other applications for the virtual computer systems may be to support database applications, electronic commerce applications, business applications and/or other applications.

When a customer 204 interacts with the virtual computer system service 208 and provisions a virtual machine instance, the customer 204 may gain access to a variety of resources. For instance, a virtual machine instance may provision an operating system and a variety of applications depending on the customer's needs. The virtual machine instance, as noted above, may be instantiated on a physical host which may be operated by the computing resource service provider 202. Accordingly, the physical host may need to comprise several hardware components that may be configured to collectively serve to provide the computing resources necessary to operate and support the virtual machine instance. Thus, the virtual computer system service 208 may, by default, instantiate a virtual machine instance on a physical host that comprises the resources necessary to support the particular instance.

In some embodiments, the customer 204 may request that a virtual machine instance be instantiated in a physical host that comprises a specific set of hardware specifications. While the hardware specifications may not have been selected by default by the virtual computer system service 208, the customer 204 may require these specifications to support its needs. As noted above, a customer 204 may develop and test software on a virtual machine instance that requires extensive resources to operate. Accordingly, the default hardware specifications provided by the virtual computer system service 208 may not be adequate for these purposes. If the customer 204 has specified that a physical host comprising a specific set of hardware specifications should be allocated for the virtual machine instance, the virtual computer system service 208 may determine whether any available physical hosts currently comprise these specifications. If there are no available physical hosts with at least the specific set of hardware specifications specified in the customer request, and the customer hardware request is a preference, the virtual computer system service 208 may instantiate the virtual machine instance in a physical host comprising the minimum hardware specifications to instantiate the virtual machine instance and maintain in the instance metadata a flag which may be triggered to identify that the virtual machine instance should be migrated to a physical host with the specified hardware components once it becomes available. However, if the hardware specifications request included in the request to create a new virtual machine instance is a requirement, the virtual computer system service 208 may display an error message and deny the request if no physical hosts are available that can satisfy the hardware specifications requirement.

Additionally, in some embodiments, a customer 204 may be able to submit a request to migrate an existing virtual machine instance to a physical host comprising a specific set of hardware specifications that may be necessary to support the customer 204 needs. If there are currently no physical hosts with at least the hardware specifications provided for in the request, the virtual computer system service 208 may keep the existing virtual machine instance in the physical host it is instantiated in without migrating the instance to a new physical host. Additionally, if the hardware specifications requested are required to support the instance, the virtual computer system service 208 may display an error message and grant the customer 204 certain options. For instance, the customer 204 may be given the option to re-configure a request to attempt to migrate a virtual machine instance to a physical host that more closely matches his or her requirements. If a physical host is available that meets the customer 204 hardware specifications, the virtual computer system service 208 may migrate the virtual machine instance to this physical host, thus fulfilling the request.

As noted above, the virtual computer system service 208 may maintain instance metadata which may include a flag that, when triggered, may specify that the customer has opted to have the virtual machine instance migrated to a physical host with certain hardware specifications when available. Thus, in some embodiments, the virtual computer system service 208 may be configured to query the metadata for each virtual machine instance when one or more slots become available in a physical host. If the virtual computer system service 208 identifies one or more virtual machine instances that are to be migrated to the physical host, the virtual computer system service 208 may be configured to apply a set of criteria to the one or more virtual machine instances to determine which instances are to be migrated. For instance, the criteria may include the length of time between the request for certain hardware specifications and the present query. Accordingly, the virtual computer system service 208 may proceed to migrate the selected virtual machine instance to the physical host with the requested hardware specifications and reset the metadata for that instance.

The data storage service 210 may comprise a collection of computing resources that collectively operate to store data for a customer 204. The data stored in the data storage service 210 may be organized into data objects. The data objects may have arbitrary sizes except, perhaps, for certain constraints on size. Thus, the data storage service 210 may store numerous data objects of varying sizes. The data storage service 210 may operate as a key value store that associates data objects with identifiers of the data objects which may be used by the customer 204 to retrieve or perform other operations in connection with the data objects stored by the data storage service 210. Access to the data storage service may be through appropriately configured application programming interface (API) calls.

The computing resource service provider 202 may additionally maintain one or more other services 212 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls to the service. This, in turn, may allow a customer 204 to maintain and potentially scale the operations in the database. Other services include, but are not limited to, object-level data storage services, object-level archival data storage services, services that manage other services and/or other services.

Figure 3:
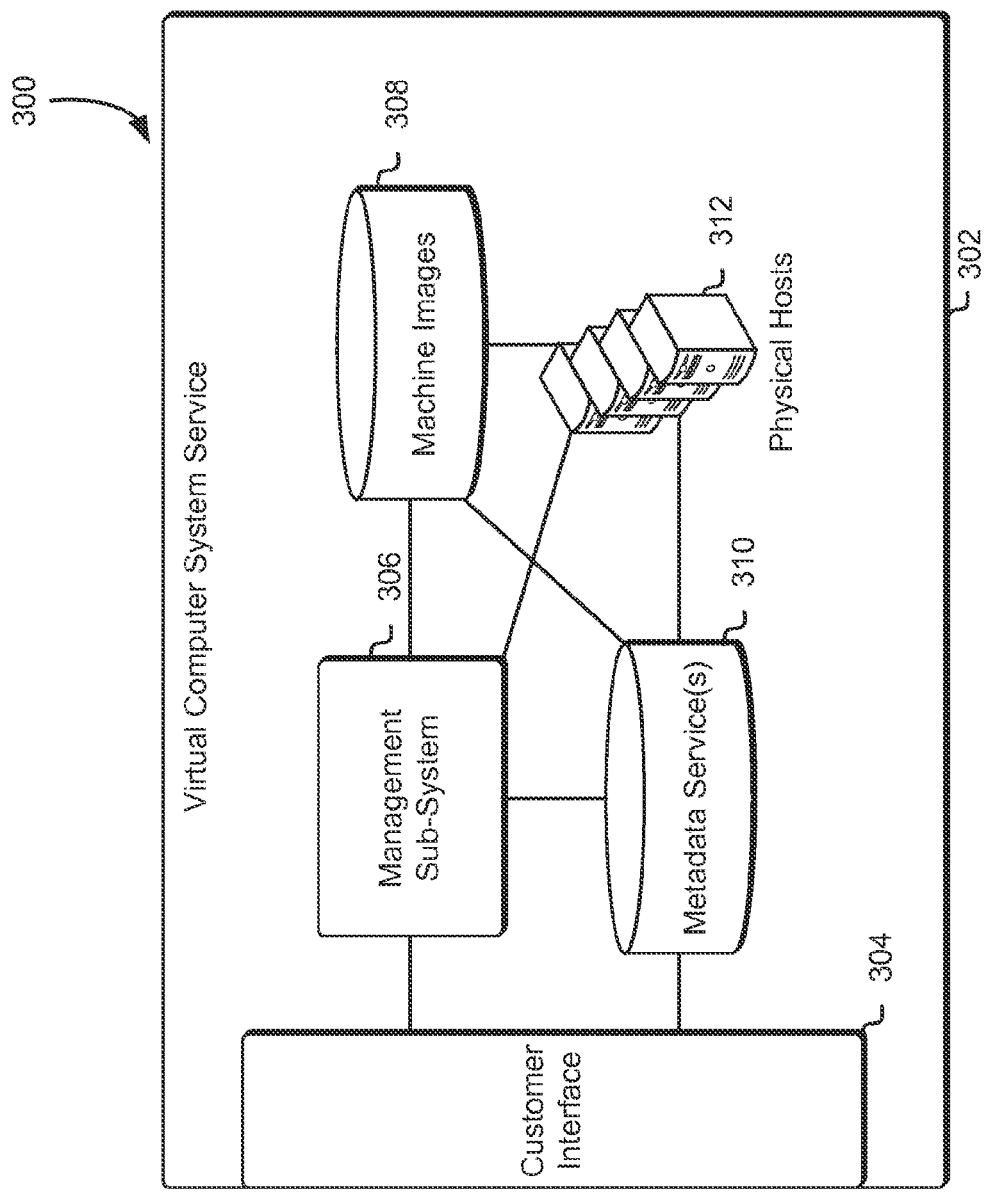
FIG. 3 shows an illustrative example of an environment in which various embodiments can be implemented.

As noted above, a virtual computer system service may be used by one or more customers to provision a virtual machine instance for a variety of uses. The virtual machine instance may permit a customer to access an operating system and a variety of applications that may enable a customer to perform certain functions (e.g., maintain one or more databases, store client information, develop web applications, etc.). Accordingly, FIG. 3 shows an illustrative example of an environment 300 that includes various components of a virtual computer system service 302 in accordance with at least one embodiment. The virtual computer system service 302 may provide customers with a customer interface 304 that may enable a customer to access the virtual computer system service 302. A customer may utilize the customer interface 304 through one or more communications networks, such as the Internet. The customer interface 304 may contain certain security safeguards to ensure that the customer has authorization to access the virtual computer system service 302. For instance, in order to access the virtual computer system service 302, a customer may need to provide a username and a corresponding password or encryption key when using the customer interface 304. Additionally, requests (e.g., API calls) submitted to the customer interface 304 may require an electronic signature generated using a cryptographic key such that the electronic signature is verifiable by the virtual computer system service 302, such as by an authorization system (not shown).

Once the customer has gained access to the virtual computer system service 302 through the customer interface 304, the virtual computer system service 302 may allow the customer to interact, through the customer interface 304, with a management sub-system 306. For instance, the management sub-system 306 may enable a customer to remotely provision a virtual machine instance. A customer may use the customer interface 304 and the management sub-system 306 to generate a virtual machine instance that includes an operating system and a variety of applications suited to the customer's needs. The operating system and the various applications may be maintained in data storage in the form of machine images 308. The virtual computer system service 302 may maintain a variety of machine images 308 based on specific customer preferences, as specified in the management sub-system 306. When a customer submits a request for provisioning a virtual machine instance through the management sub-system 306, the virtual computer system service 302 may identify the machine image the customer has requested and allocate the resources necessary (e.g., the processors and random-access memory (RAM) required to operate the components of the machine image) to process the machine image. The machine image may be instantiated on one or more physical storage devices (e.g., one or more servers or hard drives) that may act as a physical host 312 for the instance.

As an alternative to the automatic allocation of resources necessary to process the machine image, a customer may utilize the customer interface 304 and the management sub-system 306 to request a specific set of resources to process and support the machine image. For instance, if the customer is to use the virtual machine instance to create, test and manage resource intensive software or web applications, the customer may require additional resources beyond the resources necessary to just process the machine image. Accordingly, the management sub-system 306 may process a request that includes additional hardware specifications to identify a physical host 312 that includes the resources necessary to instantiate the virtual machine instance and satisfy the customer request. As noted above, the customer may specify that the request for these hardware specifications is either a preference or a requirement for the creation of an instance. In the former case, if the management sub-system 306 cannot identify a physical host 312 with the resources necessary to fulfill the customer request, the management sub-system 306 may be configured to instantiate the virtual machine instance in a physical host 306 with the resources necessary to process the machine image. Accordingly, the management sub-system 306 may be configured to trigger a metadata flag associated with the virtual machine instance such that when a physical host 312 with the requested hardware specifications becomes available, the management sub-system 306 may migrate the virtual machine instance to this physical host. In the latter case (e.g., where the request for a certain set of hardware specifications is a requirement), the management sub-system 306 may be configured to transmit executable instructions to the customer interface 304, that, when executed by the customer interface 304, cause it to display an error message if no physical hosts 312 with the required hardware specifications is available. In addition, the management sub-system 306 may not instantiate the virtual machine instance in any of the physical hosts 312.

As noted above, the management sub-system 306 may be configured to trigger a metadata flag associated with a virtual machine instance if the virtual machine instance has been instantiated in a physical host 312 that does not satisfy a customer preference for a certain set of hardware specifications. A customer may, though an appropriately configured API call to the customer interface 304, trigger a metadata flag within a virtual machine instance to specify whether the virtual machine instance should be migrated to a physical host 312 that comprises the resources necessary to support the instance. Additionally, the metadata flag may be triggered if the management sub-system 306 cannot immediately satisfy a customer preference to instantiate a virtual computing instance in a physical host 312 with the requested hardware specifications. Accordingly, the virtual computer system service 302 may maintain one or more metadata services 310 used to manage information determinative of whether a virtual machine instance instantiated in a physical host 312 should be migrated to a different physical host 312 that may have the resources necessary to satisfy a customer request. As will be described in greater detail in connection with FIG. 8, the management sub-system 306 may be configured to query the metadata services 310 to determine which existing virtual machine instances include a customer request for migration to a newly available slot in a physical host 312.

Figure 4:
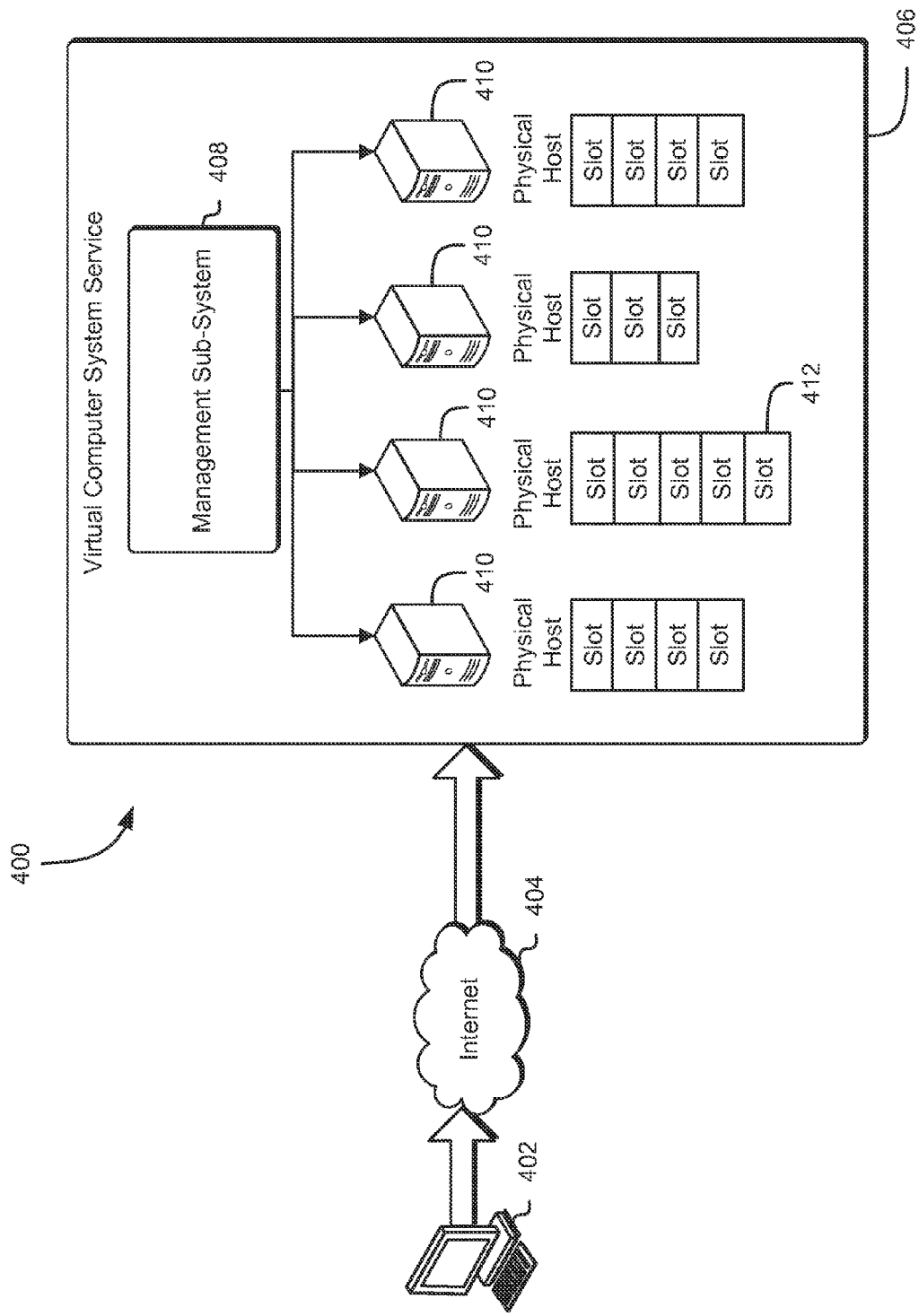
FIG. 4 shows an illustrative example of an environment in which various embodiments can be implemented.

As noted above, each physical host may comprise a plurality of slots that may be used to instantiate a virtual machine instance. Accordingly, FIG. 4 is an illustrative example of an environment 400 that includes the interaction between a management sub-system and a plurality of physical hosts which may comprise one or more slots in accordance with an embodiment. In the environment 400, a customer 402 interact with a virtual computer system service 406 by submitting one or more requests, such as through appropriately configured API calls to the service, through one or more communications networks, such as the Internet 404. As noted above, the customer 402 may utilize a customer interface and a management sub-system 408, provided by the virtual computer system service 406, to generate an instance that includes an operating system and a variety of applications suited to the customer's needs.

The management sub-system 408, as noted above, may interact with one or more physical hosts 410 to instantiate a virtual machine instance by installing a machine image into one or more physical hosts 410, dependent on the customer 402 request. Each physical host 410 may comprise a set of resources necessary to instantiate a virtual machine instance. However, each physical host 410 may include different sets of resources based on the hardware components included in the physical host 410. For instance, each physical host 410 may comprise different processing chip sets, storage devices (e.g. solid-state drives or magnetic disk drives) or RAM necessary to instantiate one or more virtual machine instances. Accordingly, certain virtual machine instances may be instantiated in some physical hosts 410 but not others.

Each physical host 410 may comprise one or more slots 412 for the allocation of a virtual machine instance. Each slot 412 may represent an allocation of a set of resources from the physical host 410 for performing one or more operations in support of the virtual machine instance. For instance, a slot may represent half of the processing capabilities of a physical host 410. When a customer 402 requests creation of a virtual machine instance, the customer 402 may be able to specify how large the virtual machine instance should be. Accordingly, the larger a virtual machine instance is, the more slots 412 the instance may consume in a physical host 410 since a large instance may require additional resources to instantiate and support the machine image (e.g., operating system and associated applications) that is part of the virtual machine instance. If a physical host 410 comprises fewer computing resources (e.g., uses older technology such as outdated or obsolete processors and/or storage devices), the physical host 410 may only include a small number of slots 412 for allocation of a virtual machine instance. Alternatively, a newer physical host 410, with greater computing resources, may be able to support additional slots 412 and thus accommodate additional virtual machine instances.

Thus, when a customer 402 submits a request to create a virtual machine instance to the virtual computer system service 406, the management sub-system 408 may be configured to determine which physical hosts 410 comprise the necessary resources to instantiate the instance. Additionally, the management sub-system 408 may determine, of these physical hosts 410, which physical host 410 comprises the necessary slots 412 for allocation. Accordingly, the management sub-system 408 may instantiate the virtual machine instance into a physical host 410 with the resources and slots 412 necessary to support the instance.

As noted above, a customer 402 may specify a preference or requirement for a set of resources that should be allocated to the virtual machine instance upon creation. In this instance, the management sub-system 408 may be configured to determine if any existing physical hosts 410 comprise the requested resources and, if so, determine whether the physical host 410 comprises slots 412 necessary to fulfill the preference or requirement. If the request includes a preference for a set of resources, and no physical hosts 410 are available to fulfill the preference, the management sub-system 408 may allocate the virtual machine instance in a physical host 410 with sufficient slots 412 to instantiate the instance and provide the minimum resources necessary to support the instance. Accordingly, if at a later time a sufficient number of slots 412 become available in a physical host 410 that comprises the resources necessary to fulfill the preference, the management sub-system may be configured to migrate the instance to this physical host 410. However, if the request includes a required set of resources to instantiate and support the virtual machine instance, the management sub-system may be configured to generate an error message if no physical hosts 410 are available to fulfill the requirement or if no slots 412 are available in a physical host 410 that may be able to fulfill the requirement.

Figure 5:
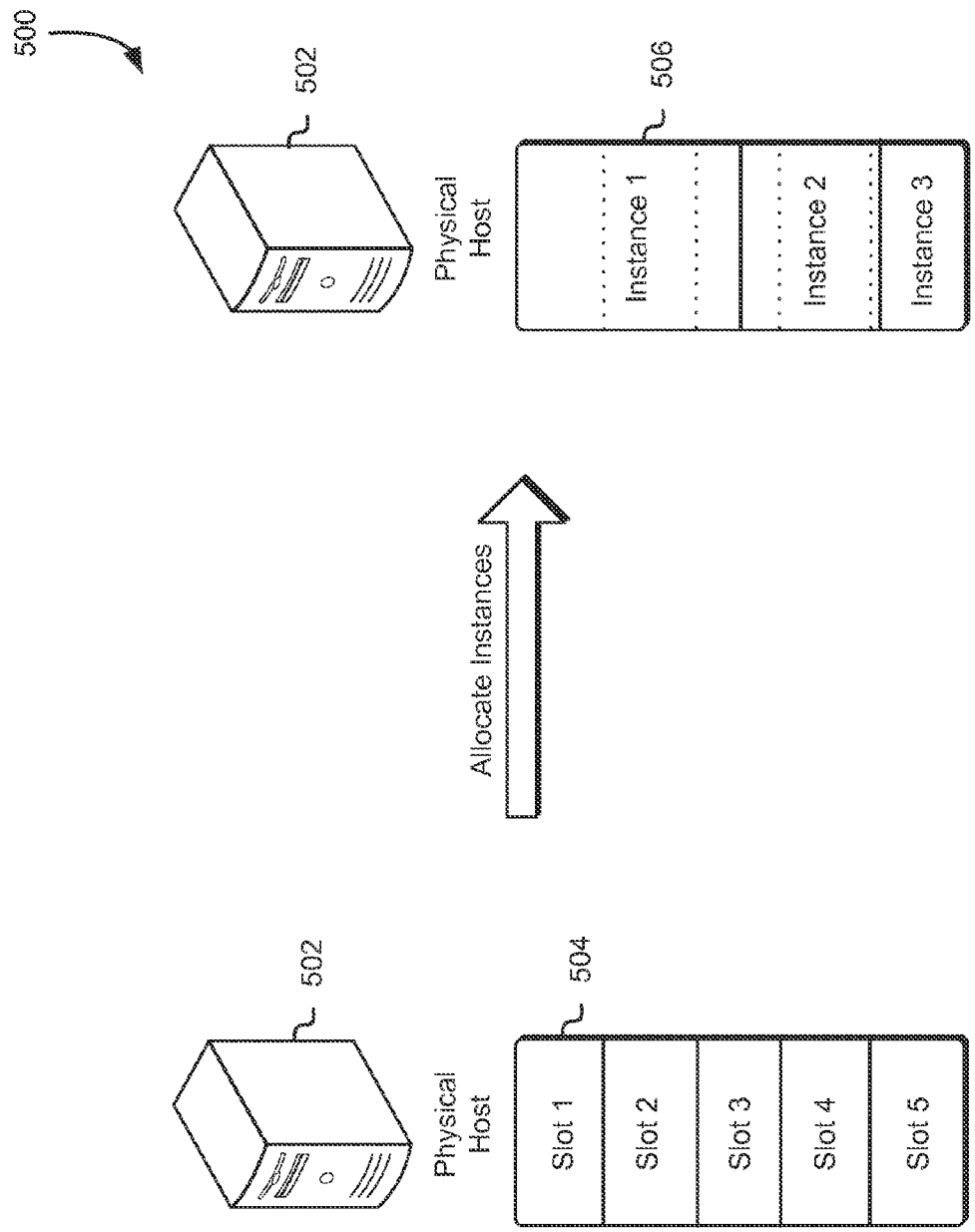
FIG. 5 shows an illustrative example of allocating one or more virtual machine instances in accordance with at least one embodiment.

FIG. 5 is an illustrative example of an environment 500 in which one or more virtual machine instances may be instantiated and allocated in accordance with at least one embodiment. As noted above, the virtual computer system service may maintain one or more physical hosts 502 which may comprise a plurality of resources which may be used to instantiate and support any virtual machine instances. As illustrated in connection with FIG. 4 above, each physical host 502 may comprise one or more slots 504 which may correspond to a portion of the resources included in the physical host 502. For instance, each slot 504 may represent a portion of processing power provided by the physical host 502 that may be apportioned on average to that slot 504.

When a customer submits a request to a virtual computer system service, such as through appropriately configured API calls to the service, to provision a virtual machine instance 506, a management sub-system may process the request and allocate the virtual machine instance 506 to a physical host 502. As noted above, the management sub-system may allocate a virtual machine instance 506 to a physical host 502 that comprises the resources necessary to instantiate and support the virtual machine instance 506. Accordingly, the physical host 502 may need to have available one or more slots 504 to instantiate a virtual machine instance 506.

As illustrated in FIG. 5, virtual machine instances 506 may be allocated to one or more slots 504 dependent upon the resources necessary or requested to support the instance 506. Accordingly, each virtual machine instance 506 may be allocated to a number of slots 504 that may be different from any other virtual machine instance 506 in the physical host 502. For instance, in the environment 500, the physical host 502 may comprise five slots 504 which may be used to allocate a number of instances 506. The management sub-system may allocate one or more instances 506 to the slots 504, as shown in FIG. 5. Accordingly, the physical host 502 in this illustrative example may include a larger instance 506 which may be allocated to over two slots 504, a mid-sized instance that may be allocated to one full slot 504 and a portion of another slot 504 and a smaller instance which may be allocated to a fraction of a slot 504. Thus, a virtual machine instance 506 may be allocated to any number or fractions of slots 504 made available in a physical host 502.

Figure 6:
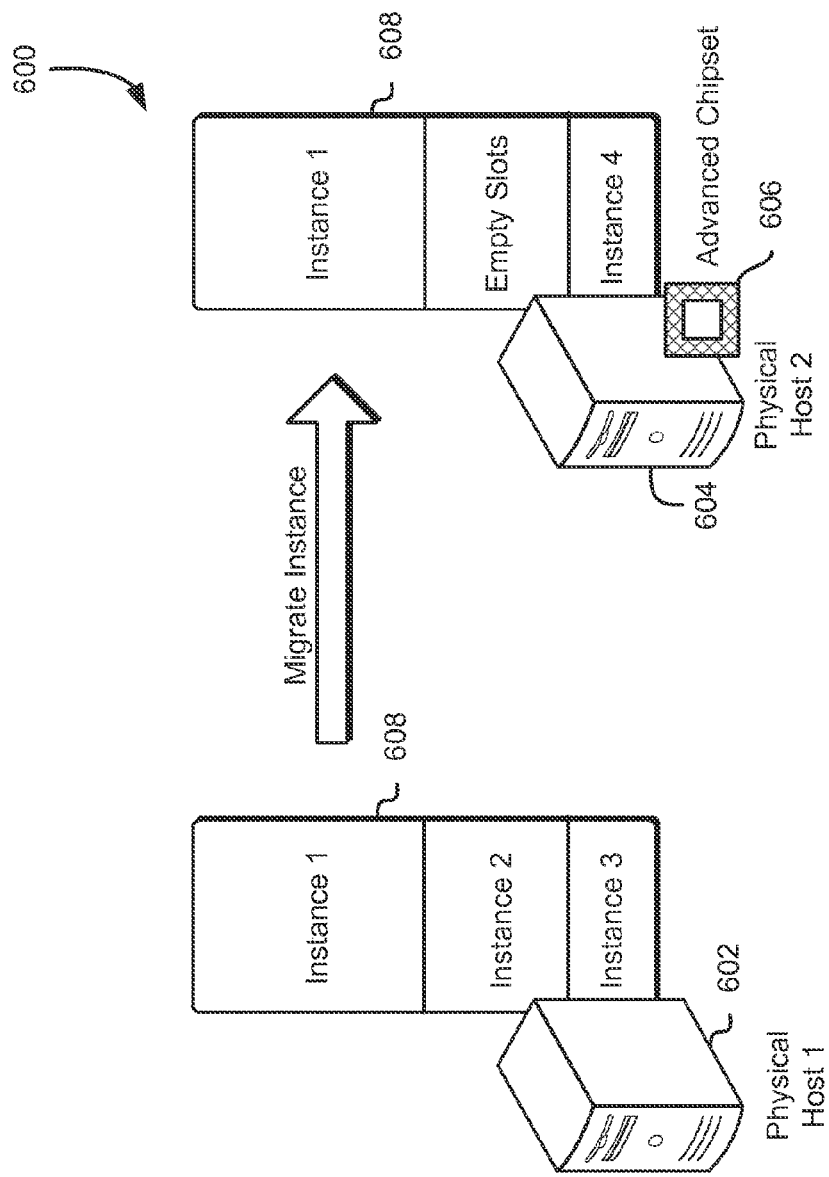
FIG. 6 shows an illustrative example of migrating a virtual machine instance from one physical host to another in accordance with at least one embodiment.

As noted above, a management sub-system may be configured to migrate an instance from one physical host to another based upon a customer preference specified when the instance was created or a later request made after the instance has been allocated. Accordingly, FIG. 6 is an illustrative example of an environment 600 in which an instance may be migrated from one physical host to another physical host in accordance with at least one embodiment. In the environment 600, a first physical host 602 may comprise one or more instances, including a first instance 608 which may be allocated to one or more slots in the first physical host 602. At a later time after initial instantiation of the first instance 608 in the first physical host 602, the management sub-system, which may be configured to manage and control the physical hosts, may receive a request to migrate the first instance 608 to a second physical host 604.

A customer may request migration of a first instance 608 from a first physical host 602 to a second physical host 604 if the customer now prefers or requires additional resources to support the first instance 608. Thus, the second physical host 604 may include one or more improved components over the first physical host 602, such as an advanced processor chipset 606. This advanced processor chipset 606 may provide substantial additional resources to the second physical host 604 which may be attractive to a customer. While the use of an advanced processor chipset 606 is used throughout the present disclosure for the purpose of illustration, the scope of the disclosure is not limited to just processor upgrades. For instance, the second physical host 604 may include other improved components, such as one or more storage devices that may provide greater data storage capacity for instantiating an instance.

If the management sub-system identifies a physical host with the resources available to satisfy the customer hardware preference or requirement, the management sub-system may proceed to migrate the first instance 608 from the first physical host 602 to the second physical host 604. The second physical host 604 may comprise a number of empty slots and occupied slots, which may have one or more instances instantiated into them. As will be described in greater detail in connection with FIG. 9, the management sub-system may obtain a snapshot of the first instance 608 and transfer this snapshot to the one or more empty slots in the second physical host 604. Accordingly, the first instance 608 may be paused and transferred to the second physical host 604 where it may be activated for use. The customer may now be able to take advantage of the advanced processor chipset 606, and any other hardware components requested, in the second physical host 604.

Figure 7:
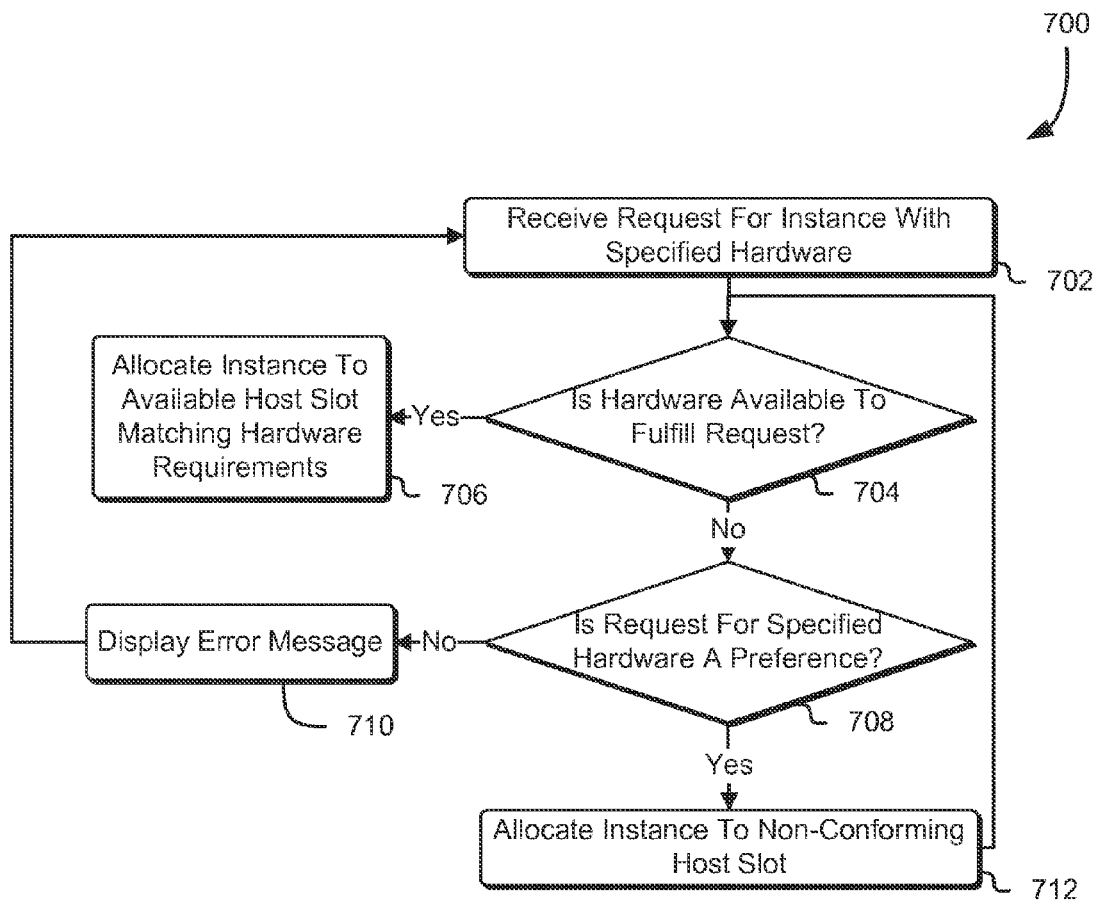
FIG. 7 shows an illustrative example of a process for allocating a virtual machine instance based on a customer request in accordance with at least one embodiment.

As noted above, a customer may submit a request to generate a virtual machine instance along with a preference or requirement for a set of resources to support the instance. Accordingly, FIG. 7 is an illustrative example of a process 700 for allocating a virtual machine instance based on a customer optionally specifiable hardware request in accordance with at least one embodiment. It should be noted that a request to provision a virtual machine instance may be processed regardless of whether the request includes an optionally specifiable hardware request. In the process 700, a virtual computer system service may include a management sub-system which may be configured to receive 702 a request, from a customer, for the generation of a virtual machine instance with a set of resources that should be allocated to the instance. The optionally specifiable hardware request for this set of resources may be either a preference or a requirement, based on the customer's needs. Alternatively, the request may include an indication that the request may be fulfilled by instantiating a virtual machine instance in a physical host that does not conform to the set of preferences. The customer may submit these requests through one or more appropriately configured API calls to the service. Additionally, if the request includes an indication, the indication may be submitted through a separate API call to the service.

Accordingly, the management sub-system may apply one or more processing algorithms to determine how to process the received request. For instance, once the management sub-system has received the one or more requests from a customer, the management sub-system may be configured to use an algorithm to determine 704 if any physical host computer systems are available to instantiate the virtual machine instance. The management sub-system may be configured to use the algorithm to query the physical host computer systems within the virtual computer system service to identify any potential physical host computer systems that satisfy the customer preference or requirements for the virtual machine instance. Subsequently, the management sub-system may be configured to use the algorithm to evaluate whether any of the potential physical host computer systems comprise sufficient empty slots to instantiate the virtual machine instance.

The management sub-system may be configured to add in this evaluation any physical hosts comprising virtual machine instances based on a preference for certain hardware resources and physical hosts comprising virtual machine instances generated with no preference whatsoever. For instance, if the request for a virtual machine instance with a certain set of resources is a preference, this request may be given priority over any existing instantiated instances created without any hardware preferences. Additionally, in another instance, if the request is a set requirement, this request may be given greater priority over any existing instantiated instances created without any hardware preferences or instances created with merely a hardware preference (e.g., not a set requirement). Thus, the management sub-system may determine that certain physical hosts are available to fulfill the request even though the hosts may comprise existing instantiated instances.

If one or more physical host computer systems comprise the resources to satisfy the customer preferences or requirements and these physical host computer systems additionally include sufficient empty slots to instantiate the virtual machine instance, the management sub-system may allocate 706 the virtual machine instance to the empty slots in the physical host computer system. If more than one physical host computer system exists, the management sub-system may be configured to apply an algorithm in order to rank the available slots within the available physical host computer systems. For example, the management sub-system may use the algorithm to generate a ranking of available slots within the available physical host computer systems based upon the hardware specifications of each physical host computer system and the resources made available to an instance instantiated in a slot. Thus, a physical host computer system that comprises one or more available slots and precisely matches the hardware specifications provided for in the request may yield a higher ranking for the slots included therein, leading to instantiation of the virtual machine instance into a slot within this physical host computer system. However, if no slots or physical host computer systems are available to accommodate the customer preferences or requirements, the management sub-system may be configured to determine 708 if the request for a specific set of resources is either a preference or a requirement. If the customer request includes a requirement for a set of resources to support the virtual machine instance, the management sub-system may be configured to transmit executable instructions to the customer interface, that when executed by the customer interface cause the customer interface to display 710 an error message. This error message may include information regarding the unavailability of resources. Additionally, the error message may invite the customer to submit the request at a later time. Thus, the management sub-system may once again receive 702 another request from the customer and repeat the process described above.

As noted above, the management sub-system may be configured to determine that a request has greater priority over an existing instantiated virtual machine instance in a physical host. In this instance, the management sub-system may migrate the existing instance to a different, available physical host in order to instantiate the requested virtual machine instance. For example, the management sub-system may be configured to migrate an existing instance comprising no hardware preferences or requirements from a physical host in order to allocate 706 an instance subject to a hardware preference to the newly available physical host slot. Similarly, if the request includes a set requirement for specified hardware, the management sub-system may migrate any existing instances comprising no hardware preferences followed by any existing instances instantiated on the host based upon a mere preference, if necessary. Thus, a request comprising a set requirement for certain hardware may take precedence over any existing instance in a physical host that does not include a set requirement.

If the customer request for a specific set of resources to support a virtual machine instance is merely an optionally specifiable hardware preference, the management sub-system may be configured to allocate 712 the instance to one or more non-conforming slots in a physical host computer system. The physical host computer system may comprise the minimum resources necessary to instantiate the instance such that a customer may still utilize the virtual machine instance for his or her purposes. In an embodiment, the management sub-system may be configured to update metadata associated with the virtual machine instance to identify that the instance should be migrated to a physical host computer system with the requested specifications once it becomes available. Thus, the virtual machine instance may be migrated automatically once an ideal physical host computer system becomes available.

Figure 8:
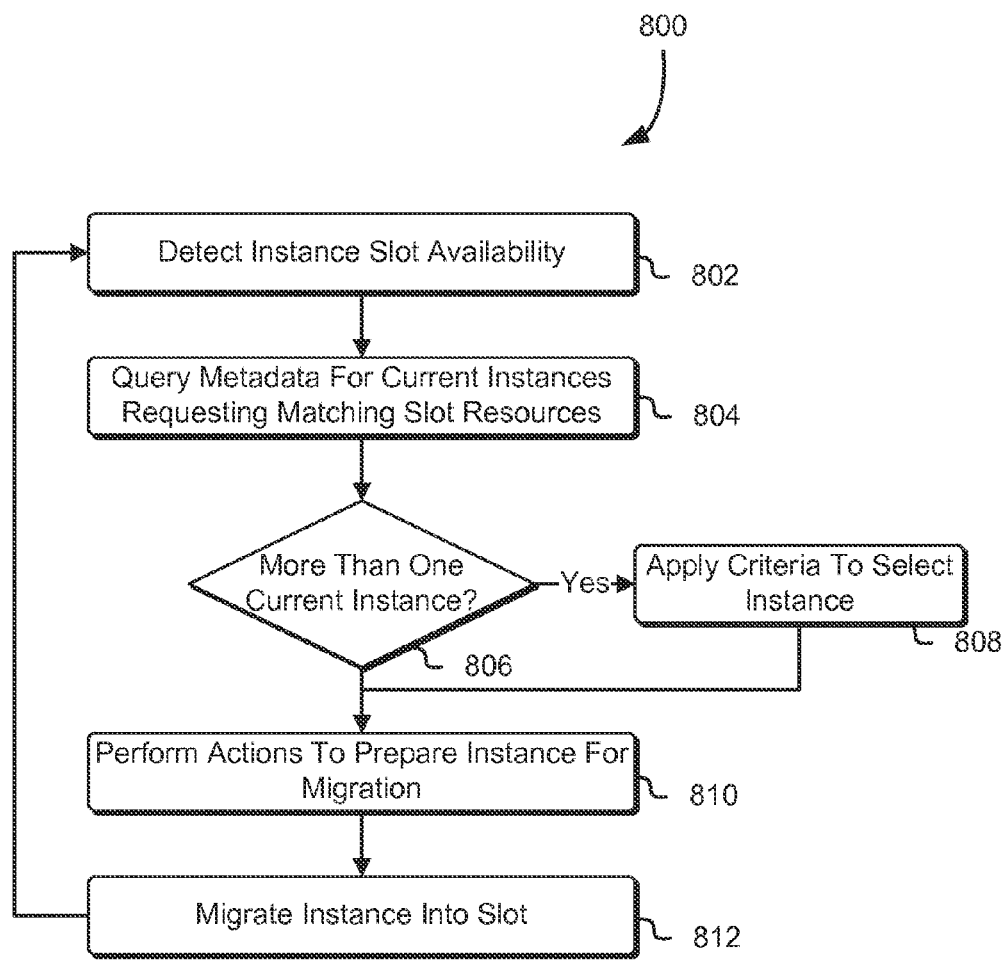
FIG. 8 shows an illustrative example of a process for migrating a virtual machine instance based on slot availability in accordance with at least one embodiment.

As noted above, the management sub-system may be configured to manage one or more physical host computer systems provided by the virtual computer system service. As part of this function, the management sub-system may be additionally configured to manage the underlying one or more slots included in each of the physical host computer systems. Accordingly, FIG. 8 is an illustrative example of a process 800 for migrating a virtual machine instance based on slot availability in accordance with at least one embodiment. The management sub-system may be configured to continuously query the physical host computer systems to determine whether any physical host computer systems include any empty slots that may be used for the allocation of a virtual machine instance. Thus, the process 800 may include detecting 802 whether one or more slots are available on a physical host computer system.

If the management sub-system detects that one or more slots in a physical host computer system have become available, the management sub-system may be configured to query 804 the metadata service to identify any existing virtual machine instances that a customer has requested to be migrated to a physical host computer system with a preferred set of resources. As noted above, if a customer submits a request to create a virtual machine instance and allocate a specific set of resources to the instance, the management sub-system may trigger a metadata flag associated with the instance if a physical host computer system with the specified set of resources is currently not available. Thus, the management sub-system may search for instances that include this metadata flag and attempt to match the instances with the available physical host computer system slots.

In some instances, physical host computer system slot availability may only support one virtual machine instance. Thus, the management sub-system may only be able to migrate one virtual machine instance from one physical host computer system to another. Accordingly, the process 800 may include determining 806 whether more than one current virtual machine instance has been flagged for migration to the available physical host computer system slots. If more than one current virtual machine instance exists that have been flagged for migration, it may be necessary for the management sub-system to apply 808 a set of criteria in order to select a virtual machine instance for migration. For instance, each virtual machine instance, when created, may be ranked according to different instance characteristics. For example, virtual machine instances may be ranked based on the requested resources (e.g., processing power and speed, storage capacity, RAM allocation, etc.). Additionally, virtual machine instances may be ranked based on esoteric criteria such as customer use volume of the virtual computer system service. Thus, a customer that has created and used more virtual machine instances may be rewarded with a higher ranking for any newly created instances. It should be noted that the examples provided above are provided for the purpose of illustration and any variations or criteria that may be utilized to rank virtual machine instances are considered within the scope of the present disclosure.

Once the management sub-system has selected a virtual machine instance, the management sub-system may be configured to perform 810 one or more actions to prepare the selected virtual machine instance for migration. As will be described in greater detail in connection with FIG. 9, the management sub-system may be configured to obtain a snapshot of the selected virtual machine instance to capture its current state prior to migration. The snapshot may subsequently be transferred to the targeted available slots such that the physical host computer system may be able to resume the instance from a most recent state and minimize the impact resulting from the migration.

As soon as the snapshot is transferred to the new physical host computer system, the management sub-system may transmit one or more executable instructions to the physical host computer system the virtual machine instance is instantiated on in order to pause the instance. Once the virtual machine instance has been paused and no further operations are taking place within the instance, the management sub-system may migrate 812 the virtual machine instance to the new physical host computer system slots and activate it for renewed use by a customer. Since the migration of the virtual machine instance may leave behind newly opened slots on a physical host computer system, the management sub-system may again detect 802 this availability and query 804 the metadata service to locate any other instances for migration. Additionally, the management sub-system may routinely inspect the physical host computer systems to detect 802 slot availability, such as described above or in an instance where a customer has requested the deletion of a virtual machine instance.

Figure 9:
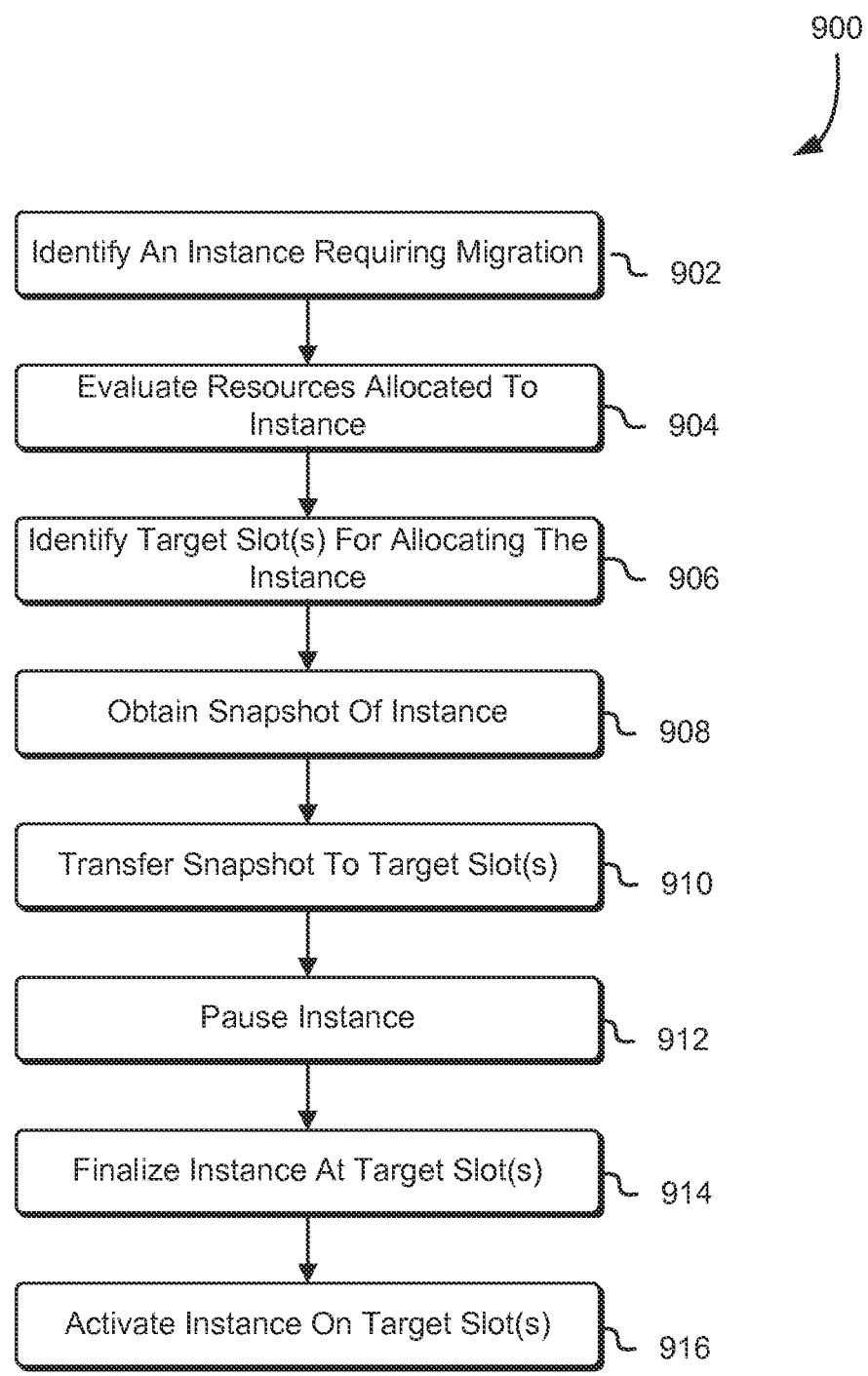
FIG. 9 shows an illustrative example of a process for preparing and migrating a virtual machine instance in accordance with at least one embodiment.

As noted above, the management sub-system may be configured to migrate a virtual machine instance if a customer has submitted a request, either prior or after creation of the virtual machine instance, to allocate a set of resources to the instance. Accordingly, FIG. 9 is an illustrative example of a process 900 for preparing and migrating a virtual machine instance in accordance with at least one embodiment. In the process 900, the management sub-system may be configured to identify 902 an instance requiring migration. This may occur in a number of ways. For instance, as illustrated in FIG. 8, the management sub-system may identify a virtual machine instance for migration by selecting an instance from a plurality of instances based on a set of criteria. The plurality of instances may comprise one or more instances with an associated metadata flag identifying these instances as being subject to a customer request for additional host resources. Alternatively, a customer may submit a request to migrate an existing virtual machine instance which may be fulfilled immediately if the resources are currently available.

Once the management sub-system has identified a virtual machine instance requiring migration, the management sub-system may be configured to evaluate 904 the resources allocated to the virtual machine instance. As noted above, a virtual machine instance may be instantiated in a physical host computer system. The physical host computer system may comprise a plurality of hardware components. For instance, the physical host computer system may include one or more processors, several RAM chipsets and one or more storage devices (e.g., solid-state drives or magnetic disk drives) configured to persistently store and instantiate the virtual machine instances. Each physical host computer system may be configured to comprise one or more slots for instantiating one or more virtual machine instances. These slots serve to allocate an average set of performance metrics to each of the virtual machine instances instantiated therein. Thus, the management sub-system may be configured to determine the current hardware specifications of the physical host computer system the virtual machine instance is currently instantiated in and the number of slots allocated to the instance.

Once the management sub-system has identified a virtual machine instance requiring migration and the necessary resources to migrate the instance, the management sub-system may be configured to identify 906 one or more target slots in a physical host computer system for allocating the virtual machine instance. As illustrated in FIG. 4, each physical host computer system may have different hardware specifications and, accordingly, varying computing capabilities. If a physical host computer system comprises older or outdated hardware, the physical host computer system may comprise fewer slots for instantiating a resource-intensive virtual machine instance. Alternatively, a physical host computer system comprising newer technology such that it may provide greater processing power and storage capacity, the physical host computer system may include more slots for allocation. Additionally, slot sizes may not be uniform across physical host computer systems. For instance, if a slot represents a percentage of resources that is allocated to an instance, a slot in one physical host computer system may represent a greater amount of resources than a slot in a different physical host computer system. Accordingly, the management sub-system may be configured to examine the targeted slots to determine how many of the targeted slots may be required for allocating the virtual machine instance.

In order to migrate an existing virtual machine instance with minimal impact and interruption, the management sub-system may be configured to obtain 908 a snapshot of the virtual machine instance. A snapshot may include the current operational state of the virtual machine instance at a given time, including information identifying an entry point for resumption of execution. Accordingly, the creation of a snapshot of the virtual machine instance may provide minimal interference with a customer utilization of the instance.

The virtual computer system service may currently implement one or more policies for generating snapshots of each of the virtual machine instances periodically in order to prevent data or computing loss resulting from a system failure. Alternatively, a snapshot may be created upon a customer or management sub-system command. After an initial snapshot is generated, subsequent snapshots may include only the additional computing and data produced after the initial snapshot, reducing the amount of data generated. Accordingly, the management sub-system be configured to either execute a command to obtain a snapshot of the instance or refer to a data store to obtain the snapshot of the virtual machine instance.

Once the management sub-system has obtained the one or more snapshots related to the virtual machine instance to be migrated, the management sub-system may be configured to transfer 910 the one or more snapshots to the targeted slots. As noted above, the management sub-system may be configured to determine how many slots or fractions of a slot a virtual machine instance may occupy in a physical host computer system upon migration. Accordingly, the management sub-system may be configured to transfer the one or more snapshots to the slots reserved for the virtual machine instance being migrated.

The management sub-system may be configured to pause 912 the virtual machine instance operating in a physical host computer system in order to continue the migration process. The management sub-system, during this time, may prevent a customer from performing any additional read or write operations within the virtual machine instance. Additionally, the management sub-system may be configured to transmit one or more commands, executable by the customer interface, which would cause the customer interface to display a notification to the customer detailing the extent of the downtime resulting from the pausing of the virtual machine instance. This informative notification may allow a customer to prepare any data for migration or enact contingency plans for the duration of the downtime. In an embodiment, the management sub-system may be configured to reboot the virtual machine instance in lieu of pausing 912 the virtual machine instance such that the virtual machine instance may be restarted in the second physical host computer system, post migration. In other words, a reboot process may include shutting the virtual machine instance down and restarting the virtual machine instance on another computer system. Alternatively, the management sub-system may be configured to await an elective shutdown of the virtual machine instance from the customer prior to completing the migration process.

After the virtual machine instance has been paused, the management sub-system may now proceed to finalize 914 the virtual machine instance at the one or more target slots on the new physical host computer system. This may include transferring any additional snapshots that may have been taken by the virtual computer system service subsequent to transferring the prior snapshots to the targeted hosts and prior to pausing the virtual machine instance. Additionally, the management sub-system may be configured to restore the virtual machine instance on these targeted slots using the snapshots available on the targeted slots. Once the virtual machine instance has been restored on the new physical host computer system, the management sub-system may proceed to detach the old virtual machine instance from the prior physical host computer system and delete it, thus making available the physical host computer system slots on the prior physical host computer system.

Once the management sub-system has finalized the instance at the targeted slots, the management sub-system may activate 916 the virtual machine instance on the targeted slots in the new physical host computer system. Accordingly, the management sub-system may be configured to transmit one or more executable instructions that, when executed by the customer interface, may cause the customer interface to notify the customer that the virtual machine instance is now available for use. Accordingly, the customer may utilize the customer interface and the management sub-system to resume his or her interactions with the virtual machine instance, according to the customer's needs.

Figure 10:
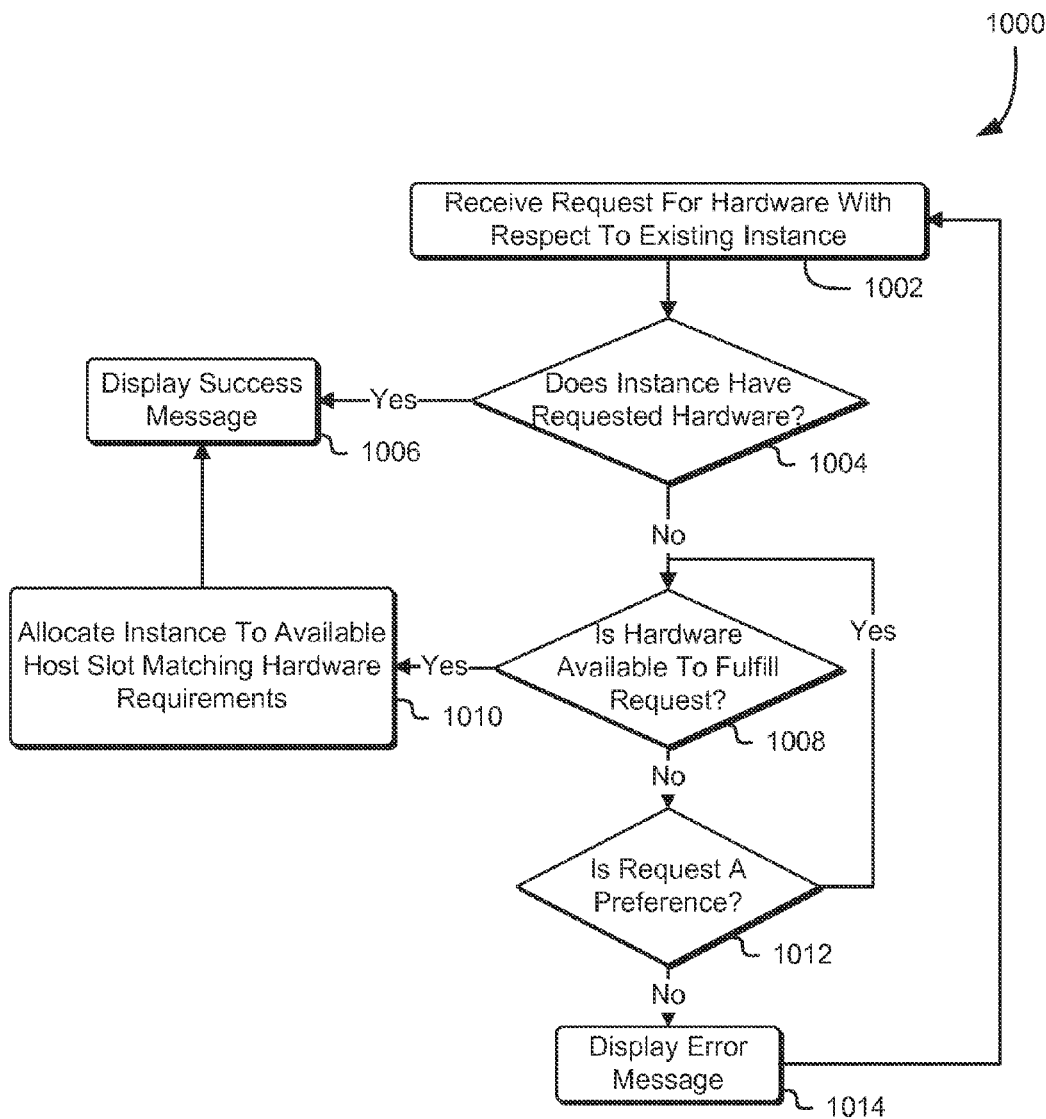
FIG. 10 shows an illustrative example of a process for processing a request for hardware allocation to an existing virtual machine instance in accordance with at least one embodiment.

As noted above, a customer may utilize the customer interface and management sub-system provided by a virtual computer system service to request that certain hardware specifications support a virtual machine instance. Accordingly, FIG. 10 is an illustrative example of a process 1000 for processing a request for hardware allocation to an existing virtual machine instance in accordance with at least one embodiment. A management sub-system, such as described above, may be configured to perform the process 1000, which may include receiving 1002 a request for hardware allocation with respect to an existing virtual machine instance. A customer may submit this request using the customer interface to make one or more appropriately configured API calls to the service. Accordingly, the request may be processed by the management sub-system to determine resolution.

Once the management sub-system has received the request, the management sub-system may determine 1004 whether the existing virtual machine instance is currently instantiated in a physical host computer system that comprises the requested hardware. If the virtual machine instance is currently instantiated in a physical host computer system that comprises the requested hardware, the management sub-system may transmit one or more commands to the customer interface that, when executed by the customer interface, cause the customer interface to display 1006 a success message. The success message may include an informative notification to the customer that the virtual machine instance currently has been allocated to a physical host computer system with the requested hardware specifications or simply that the request is successfully fulfilled.

If the virtual machine instance is not allocated to a physical host computer system with the requested hardware specifications, the management sub-system may be configured to additionally determine 1008 if there is a physical host computer system with the requested hardware specifications currently available to fulfill the request. As noted above, each physical host computer system may comprise one or more slots which may be used to instantiate the virtual machine instance. Each slot may serve to allocate an average set of performance metrics to each of the virtual machine instances instantiated therein. Thus, the management sub-system may be configured to evaluate any physical host computer systems with available slots to determine if a physical host computer system includes the hardware specifications requested and includes the slots necessary to instantiate and support the virtual machine instance.

If a physical host computer system that includes the requested hardware specifications is available, the management sub-system may allocate 1010 the virtual machine instance to the one or more slots in the physical host computer system. As illustrated in FIG. 9, the management sub-system may be configured to obtain one or more snapshots for the existing virtual machine instance and transfer these snapshots to the available slots in the physical host computer system. Subsequently, the management sub-system may pause the virtual machine instance and prepare the virtual machine instance on the new physical host computer system for use. The management sub-system may be configured to delete the virtual machine instance from the prior physical host computer system and activate the virtual machine instance on the new physical host computer system. Once the virtual machine instance is ready for use, the management sub-system may be configured to transmit one or more commands to the customer interface that, when executed by the customer interface, cause the customer interface to display 1006 a message that the migration was a success. Additionally, the message may include an informative notification that may inform a customer that the virtual machine instance is now ready for use.

The management sub-system may be configured to determine 1012 if the customer request is a preference or a requirement if no physical host computer systems are currently available to fulfill the request. As noted above in connection with FIG. 7, if the customer request is a preference for a physical host computer system with certain hardware specifications, the virtual machine instance may be instantiated in a physical host computer system that includes at least the minimum hardware specifications required to instantiate the virtual machine instance. Additionally, the management sub-system may be configured to modify a metadata flag associated with the virtual machine instance such that the virtual machine instance may be considered for migration if a physical host computer system with the requested hardware specifications becomes available. Thus, in a similar fashion, if a customer submits a request to migrate an existing virtual machine instance to a physical host computer system that includes certain hardware specifications, the management sub-system may be configured to trigger a metadata flag associated with the virtual machine instance such that the virtual machine instance may be considered for migration if the requested physical host computer system becomes available.

However, if the customer request is not a preference but instead is a requirement, the management sub-system may be configured to transmit one or more executable instructions to the customer interface that, when executed by the customer interface, causes the customer interface to display 1014 an error message. The error message may, for instance, include one or more informative notifications that describe the lack of availability of a physical host computer system with the required hardware specifications and alternative options available to the customer. Accordingly, the management sub-system may be configured to allow a customer to modify his or her request for a physical host computer system with certain hardware specifications and submit the request. Thus, the management sub-system may again receive 1002 the modified request for migration of the existing instance to a physical host computer system with certain hardware specifications.

Figure 11:
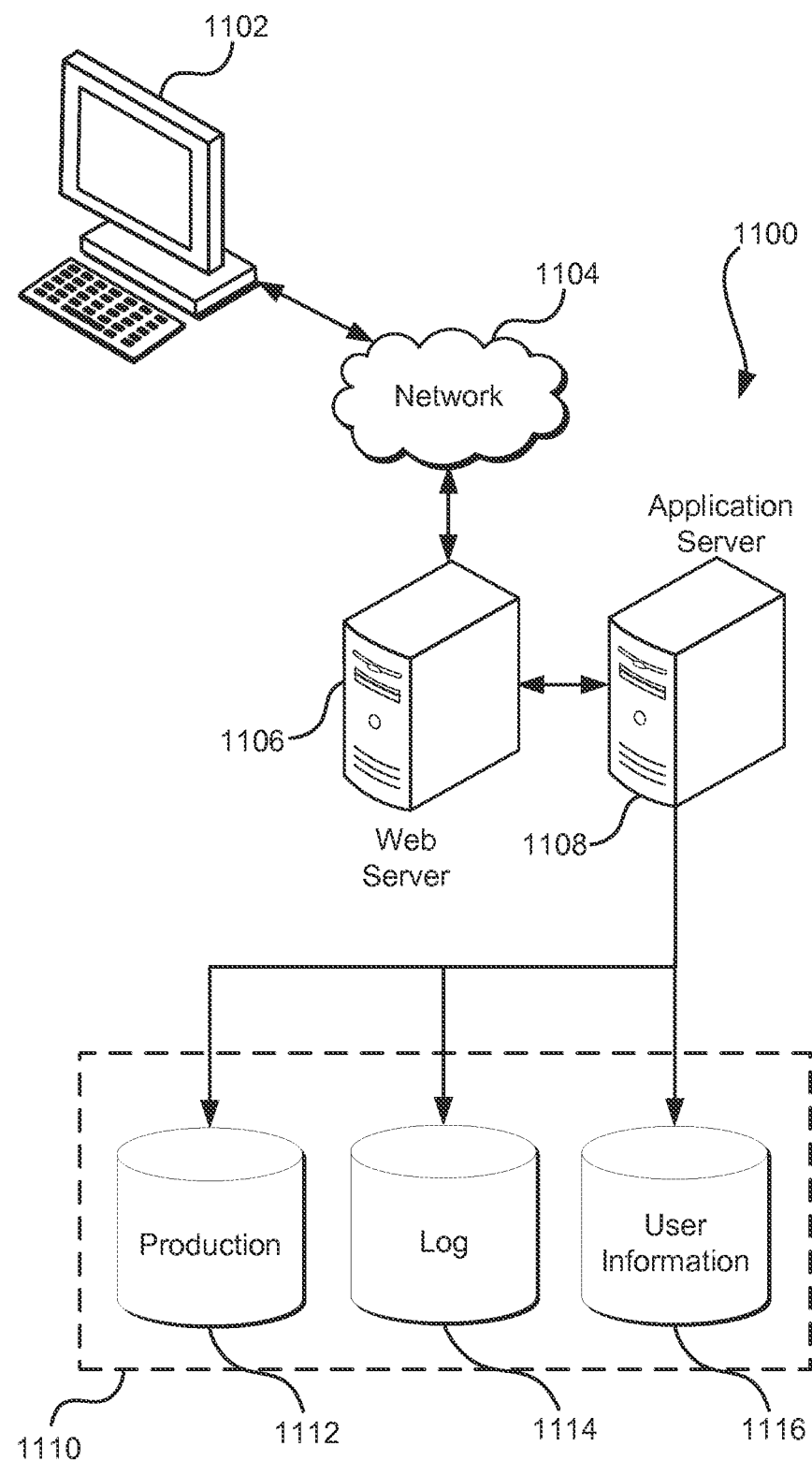
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1110 can include several separate data tables, databases or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for migrating a virtual machine instance, comprising:
    under the control of one or more computer systems of a virtual computer system service, the one or more computer systems configured with executable instructions,
        receiving a set of preferences from a customer, the set of preferences including one or more hardware specifications for instantiating a virtual machine instance that indicates an optionally specifiable hardware preference for instantiating a virtual machine instance, the set of preferences received via an interface through which one or more requests for instantiation of a virtual machine instance from a plurality of virtual machine instance types can be submitted, one or more of the plurality of virtual machine instance types being capable of being requested with the optionally specifiable hardware preference;

instantiating the virtual machine instance to result in an instantiated virtual machine instance in a first physical host computer system, the first physical host computer system comprising hardware that does not conform to the set of preferences by lacking the indicated optionally specifiable hardware preference at the time of instantiation of the virtual machine instance;

generating for the instantiated virtual machine instance, a metadata flag that identifies that the instantiated virtual machine instance should be migrated to a physical host computer system that conforms to the set of preferences by comprising hardware that has the indicated optionally specifiable hardware preference if capacity within a conforming physical host computer system becomes available that comprises the indicated optionally specifiable hardware preference defined by the preferences;

detecting, as a result of the metadata flag, available capacity within a second physical host computer system after instantiation of and during execution of the virtual machine instance, the second physical host computer system comprising hardware that conforms to the set of preferences by comprising the indicated optionally specifiable hardware preference defined by the preferences; and migrating, as a result of the metadata flag, the virtual machine instance from the first physical host computer system to the second physical host computer system partially due to having detected the available capacity within the second physical host computer system.

2. The computer-implemented method of claim 1, wherein the set of preferences are received concurrently with a request to provision a virtual machine instance.

3. The computer-implemented method of claim 2, wherein the request to provision a virtual machine instance includes an indication of being fulfillable by instantiating the virtual machine instance using hardware that does not conform to the set of preferences for an amount of time.

4. The computer-implemented method of claim 1, wherein the method further comprises:
  detecting an elective shutdown of the virtual machine instance; and
  migrating the virtual machine instance from the first physical host computer system to the second physical host computer system includes restarting the virtual machine instance on the second physical host computer system to restore the virtual machine instance from the elective shutdown.

5. The computer-implemented method of claim 1, wherein the set of preferences are part of a request to migrate an existing virtual machine instance from the first physical host computer system to the second physical host computer system.

6. The computer-implemented method of claim 4, further comprising denying the request to migrate the existing virtual machine instance due at least in part to unavailable capacity in a set of physical host computer systems conforming to the set of preferences.

7. The computer-implemented method of claim 1, wherein migrating comprises rebooting the virtual machine instance upon detecting available capacity of the second physical host computer system such that the virtual machine instance restarts on the second physical host computer system.

8. A computer-implemented method for migrating a virtual machine instance, comprising:
  under the control of one or more computer systems configured with executable instructions,
    instantiating the virtual machine instance to result in an instantiated virtual machine instance in a first computer system, the first computer system comprising one or more components that do not conform, at the time of instantiation of the virtual machine instance, to a preference for one or more hardware specifications for instantiating a virtual machine instance that indicates an optionally specifiable hardware preference for instantiating a virtual machine instance, the preference received via an interface through which one or more requests for instantiation of a virtual machine instance from a plurality of virtual machine instance types can be submitted, one or more of the plurality of virtual machine instance types being capable of being requested with the optionally specifiable hardware preference;
    generating for the instantiated virtual machine instance a metadata flag that identifies that the instantiated virtual machine instance should be migrated to a physical host computer system that conforms to the preference if capacity within a conforming physical host computer system becomes available;
    detecting, as a result of the metadata flag, and after instantiation of and during execution of the virtual machine instance, a condition within a second host computer system that conforms to the preference; and
    migrating, as a result of the metadata flag, the virtual machine instance from the first computer system to the second host computer system due at least in part to having detected the condition within the second host computer system.

9. The computer-implemented method of claim 8, wherein the condition is based at least in part on availability of capacity within the second host computer system for instantiating the virtual machine instance.

10. The computer-implemented method of claim 8, wherein the preference is received through an interface through which one or more requests for instantiation of a virtual machine instance can be submitted.

11. The computer-implemented method of claim 8, wherein the preference includes a requirement for migration of the virtual machine instance based at least in part on a host computer system comprising the one or more hardware specifications.

12. The computer-implemented method of claim 8, wherein migrating the virtual machine instance is performed without rebooting the virtual machine instance.

13. The computer-implemented method of claim 8, wherein instantiating the virtual machine instance in the first computer system is performed to fulfill a request to provision the virtual machine instance, the request including the preference.

14. A computer system, comprising:
  an interface through which one or more requests for instantiation of a virtual machine instance from a plurality of virtual machine instance types can be submitted, one or more of the plurality of virtual machine instance types being capable of being requested with an optionally specifiable hardware preference;

one or more host computer systems comprising hardware components collectively configured to instantiate a virtual machine instance; and a management sub-system configured to process a request received through the interface, wherein:

the virtual machine instance is instantiated in a first host computer system from the one or more host computer systems to result in an instantiated virtual machine instance, the first computer system comprising one or more components that do not conform, at the time of instantiation of the virtual machine instance, to the optionally specifiable hardware preference for one or more hardware specifications for instantiating the virtual machine instance that indicates a hardware component for instantiating a virtual machine instance;

a metadata flag is associated with the instantiated virtual machine instance that identifies that the instantiated virtual machine instance should be migrated to a host computer system that conforms to the set of preferences if capacity within a conforming physical host computer system becomes available; and the virtual machine instance is migrated, as a result of the metadata flag and after instantiation of and during execution of the virtual machine instance, from the first host computer system to a second host computer system that conforms to the optionally specifiable hardware preference.

15. The computer system of claim 14, wherein the virtual machine instance is migrated based at least in part on availability of one or more slots in the second host computer system, the one or more slots comprising capacity that is allocated to a virtual machine instance.

16. The computer system of claim 14, wherein the management sub-system is further configured to migrate an existing virtual machine instance from the second host computer system to a non-conforming host computer system based at least in part on the optionally specifiable hardware preference.

17. The computer system of claim 14, wherein the virtual machine instance is migrated to the second host computer system based at least in part on a ranking of a set of available placement locations within the one or more host computer systems based at least in part on whether the available placement locations satisfy the optionally specifiable hardware preference.

18. The computer system of claim 14, wherein the virtual machine instance is instantiated within the first host computer system that does not conform to the optionally specifiable hardware preference as a result of a lack of capacity for the virtual machine instance in a set of host computer systems that satisfy the optionally specifiable hardware preference.

19. The computer system of claim 14, wherein the virtual machine instance is migrated from the first host computer system to the second host computer system without rebooting the virtual machine instance.

20. One or more non-transitory computer-readable storage media having collectively stored therein instructions that, when executed by one or more processors of a computer system, cause the computer system to fulfill a set of preferences that includes one or more hardware specifications for instantiating a virtual machine instance that indicates an optionally specifiable hardware preference for instantiating a virtual machine instance by causing the computer system to at least:

implement, for an amount of time, the virtual machine instance to result in an instantiated virtual machine instance using a first host computer system that fails to conform to the one or more hardware specifications at the time of instantiation of the virtual machine instance;

generate in the instantiated virtual machine a metadata flag that identifies that the instantiated virtual machine instance should be migrated to a host computer system that conforms to the set of preferences if capacity within a conforming host computer system becomes available; and migrate the virtual machine instance, as a result of the metadata flag and after instantiation of and during execution of the virtual machine instance, from the first host computer system to a second host computer system that conforms to the one or more hardware specifications, wherein the set of preferences are received via an interface through which one or more requests for instantiation of a virtual machine instance from a plurality of virtual machine instance types can be submitted, one or more of the plurality of virtual machine instance types being capable of being requested with the optionally specifiable hardware preference.

21. The one or more non-transitory computer-readable storage media of claim 20, wherein migrating includes selecting the second host computer system based at least in part on a ranking of available slots for the virtual machine instance based at least in part on underlying hardware specifications for the available slots.

22. The one or more non-transitory computer-readable storage media of claim 20, wherein the set of preferences are received in a request to provision the virtual machine instance.

23. The one or more non-transitory computer-readable storage media of claim 20, wherein the instructions further cause the computer system to deny a request to provision another virtual machine instance as a result of the request specifying one or more hardware specifications for which capacity for virtual computer system instantiation is unavailable.

24. The one or more non-transitory computer-readable storage media of claim 20, wherein:

the instructions further cause the computer system to detect an elective shutdown of the virtual machine instance; and migrating the virtual machine instance occurs such that the virtual machine instance restarts on the second host computer system.

25. The one or more non-transitory computer-readable storage media of claim 20, wherein the instructions further cause the virtual computer system to reboot the virtual computer system from the first host computer system to the second host computer system.

* * * * *